(12) United States Patent
Wasay et al.

(10) Patent No.: US 10,432,539 B2
(45) Date of Patent: Oct. 1, 2019

(54) NETWORK TRAFFIC DATA SUMMARIZATION

(71) Applicant: EntIT Software LLC, Sunnyvale, CA (US)

(72) Inventors: Abdul Wasay, Sunnyvale, CA (US); Alkiviadis Simitsis, Santa Clara, CA (US); Martin Arlitt, Calgary (CA)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/841,137

(22) Filed: Dec. 13, 2017

(65) Prior Publication Data

US 2019/0182167 A1    Jun. 13, 2019

(51) Int. Cl.
*H04L 12/815*  (2013.01)
*H04L 12/26*  (2006.01)
*H04L 12/825*  (2013.01)

(52) U.S. Cl.
CPC ........ *H04L 47/225* (2013.01); *H04L 43/0888* (2013.01); *H04L 43/16* (2013.01); *H04L 47/25* (2013.01)

(58) Field of Classification Search
CPC ... H04L 47/225; H04L 47/25; H04L 43/0888; H04L 43/16
See application file for complete search history.

(56) References Cited

U.S. PATENT DOCUMENTS

| | | | |
|---|---|---|---|
| 7,028,083 | B2 | 4/2006 | Levine et al. |
| 7,734,815 | B2 | 6/2010 | Leighton et al. |
| 7,764,625 | B2 | 7/2010 | Duffield et al. |
| 8,019,865 | B2 | 9/2011 | Chang et al. |
| 8,806,632 | B2 | 8/2014 | Stefanidakis et al. |
| 9,083,560 | B2 | 7/2015 | Lee et al. |
| 9,380,071 | B2 | 6/2016 | Liljenstam et al. |
| 9,426,029 | B2 | 8/2016 | Saavedra |
| 9,634,851 | B2 | 4/2017 | Haley et al. |
| 9,699,205 | B2 | 7/2017 | Muddu et al. |
| 10,127,908 | B1* | 11/2018 | Deller ..................... G10L 15/22 |
| 2005/0210520 | A1* | 9/2005 | Horvitz ................ H04N 21/482 725/89 |
| 2005/0262057 | A1 | 11/2005 | Lesh et al. |

(Continued)

OTHER PUBLICATIONS

"IP Network Browsing with Network Performance Monitor", download date Sep. 1, 2017, 6 pages. http://www.solarwinds.com/topics/ip-network-browser.

(Continued)

*Primary Examiner* — Stephen J Clawson

(57) ABSTRACT

According to examples, an apparatus may include a processor and a memory on which is stored machine readable instructions executable by the processor to: access network traffic data pertaining to data flows among nodes in a network; partition the network traffic data into a plurality of windows; for each of the plurality of windows, aggregate data flows between pairs of nodes; compute a data distribution of each of the aggregated data flows; select a summary structure for each of the aggregated data flows based on the computed data distributions of the aggregated data flows; generate a summary of each of the aggregated data flows using the selected summary structures for the aggregated data flows; and store the generated summaries.

18 Claims, 4 Drawing Sheets

(56) References Cited

U.S. PATENT DOCUMENTS

| | | | |
|---|---|---|---|
| 2007/0019548 A1 | 1/2007 | Krishnamurthy | |
| 2007/0111771 A1* | 5/2007 | Ihori | A63F 13/10 463/8 |
| 2009/0086651 A1* | 4/2009 | Luft | H04L 41/5067 370/253 |
| 2012/0084531 A1* | 4/2012 | Funk | G06F 12/0223 711/171 |
| 2013/0321458 A1 | 12/2013 | Miserendino et al. | |
| 2013/0326049 A1* | 12/2013 | Talton | H04L 43/04 709/224 |
| 2015/0199408 A1* | 7/2015 | Wulff | G06F 17/30424 707/688 |
| 2015/0350229 A1 | 12/2015 | Mitchell | |
| 2016/0140123 A1* | 5/2016 | Chang | G06F 17/3043 707/760 |
| 2016/0212172 A1 | 7/2016 | Senanayake et al. | |
| 2016/0308898 A1 | 10/2016 | Teeple et al. | |
| 2016/0328159 A1 | 11/2016 | Coddington et al. | |
| 2017/0118236 A1 | 4/2017 | Devi Reddy et al. | |
| 2017/0237760 A1* | 8/2017 | Holeman | G06F 9/45558 726/22 |

OTHER PUBLICATIONS

"LANState—Network Mapper and Device Monitor", download date Aug. 21, 2017, 5 pages. http://www.10-strike.com/lanstate.

Brent Stewart, "CCNP TSHOOT 642-832 Quick Reference", Feb. 16, 2010, 69 pages. Ciscopress.com.

Florian Mansmann, "Visual Analysis of Network Traffic-Interactive Monitoring, Detection, and Interpretation of Security Threats", Jun. 13, 2008, 186 pages. https://www.uni-konstanz.de/mmsp/pubsys/publishedFiles/Mansmann08.pdf.

Josef Niedermeier, "Net Flow Data Processing using Hadoop and Vertica", Jun. 1, 2017, 4 pages. https://www.slideshare.net/JosefNiedermeier1/netflow-data-processing-using-hadoop-and-vertica.

Omar Santos, "Big Data Analytics and NetFlow", Oct. 19, 2015, 3 pages. http://www.ciscopress.com/articles/article.asp?p=2437424.

Varun Chandola et al., "Summarization—Compressing Data into an Informative Representation", Fifth IEEE International Conference on Data Mining, Nov. 27-30, 2005, Houston, TX, IEEE, 8 pages. https://pdfs.semanticscholar.org/4d05/2464408345de791389604288730979b756da.pdf.

Chandola, et al., "Summarization-Compressing Data Into an informative Representation", Knowledge and Information Systems, vol. 12, No. 3, 2007, pp. 1-24.

Cormode, et al., "Synopses for Massive Data: Samples, Histograms, Wavelets, Sketches", Foundations and Trends in Databases, vol. 4, Nos. 1-3:1-294, 2012, 296 pages.

Ertoz, et al., "Detection and Summarization of Novel Network Attacks Using Data Mining", Minnesota INtrusion Detection System (MINDS) Technical Report, 2003, 20 pages.

Estan, et al., "Building a Better Netflow". SIGCOMM Computer Communication Review, vol. 34, No. 4, Aug. 2004, pp. 245-256.

Gilbert, et al., "QuickSAND: Quick Summary and Analysis of Network Data", DIMACS Technical Report, Nov. 2001, 25 pages.

Holz, et al., "The SSL Landscape—A Thorough Analysis of the X. 509 PKI Using Active and Passive Measurements", In Proceedings of the ACM SIGCOMM Conference on Internet Measurement Conference, Nov. 2011, pp. 427-444.

Kornexl, et al., "Building a Time Machine for Efficient Recording and Retrieval of High-Volume Network Traffic", In Proceedings of the 5th ACM SIGCOMM Conference on Internet Measurement, USENIX Association, 2005, pp. 267-272.

Najafabadi, et al., "Detection of SSH Brute Force Attacks Using Aggregated Netflow Data", In IEEE 14th International Conference on Machine Learning and Applications (ICMLA), Dec. 2015 pp. 283-288.

Sperotto, et al., "An Overview of IP Flow-Based Intrusion Detection", IEEE Communications Surveys and Tutorials, vol. 12, No. 3, Third Quarter 2010, pp. 343-356.

Wang, et al., "sFlow: Towards Resource-Efficient and Agile Service Federation in Service Overlay Networks", In Proceedings of IEEE 24th International Conference on Distributed Computing Systems, Mar. 2004, pp. 628-635.

* cited by examiner

NETWORK TRAFFIC DATA SUMMARIZATION

BACKGROUND

Raw network traffic data, such as NetFlow data, is a set of records that describe network traffic where each record may have different features pertaining to timestamps, Internet Protocol (IP) addresses, ports involved in sending and receiving network data, numbers of packets, bytes transferred, etc. The network traffic data may have a large mix of categorical and continuous attributes. In addition, the number of flows and/or the volume of the network traffic data may be extremely large, which may make the network traffic data unsuitable for manual monitoring. In addition, the network traffic data may be so voluminous that the network traffic data may exceed the processing capabilities of some data processing and analytics systems.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
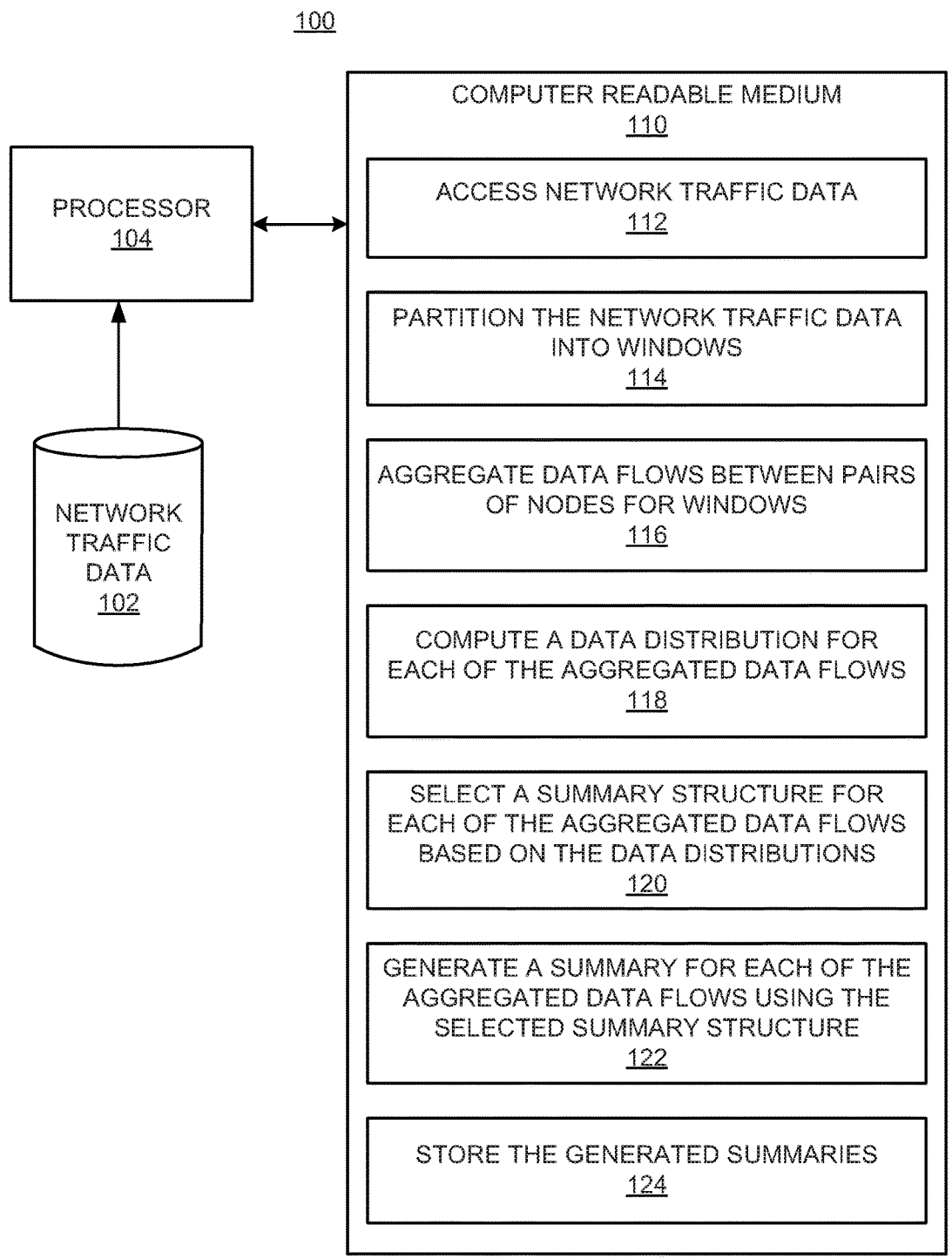
FIG. 1 shows a block diagram of an example apparatus that may summarize network traffic data.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses and methods for summarization of network traffic data. The apparatuses disclosed herein may be also referred to as data summarization systems. Network traffic may refer to data moving across a network at a given point of time. In addition, network traffic data in computer networks may mostly be encapsulated in network packets traveling between network nodes, which may represent different devices, such as servers, gateways, switches, computers, computer dusters etc., that generate or provide the network traffic data in the network. The apparatuses disclosed herein may accumulate the network traffic data, which may be, for instance, NetFlow data, at a data broker (for example, Apache™ Kafka) and may summarize the accumulated network traffic data. In addition, or in other examples, the apparatuses disclosed herein may summarize network traffic data accumulated at a plurality of data brokers.

Generally speaking, data summarization may be implemented in data mining, which may involve data processing to produce a compact description of an original large data set, often referred to as a summary. Data summarization may deal with two interdependent criteria—data compaction gains and information loss. According to examples, the apparatuses disclosed herein may implement a data summarization process to compact data sufficiently so that an analytics system may process the data while the data still contains a sufficient amount of valuable statistical information for efficient analytics.

Network traffic data, such as NetFlow logs, may retain records for every traffic flow on a network. This may amount to terabytes (or even more) of network traffic data being gathered per day. As discussed above, the network traffic data may exceed the processing capabilities of some data processing and analytics systems, and thus use of the network traffic data in its original raw state may be impractical. According to examples, the apparatuses disclosed herein may reduce, summarize, and/or condense the network traffic data collected over a time period for the network traffic data to be analyzed while the network traffic data retains its informational value. In other words, the apparatuses disclosed herein may summarize the network traffic data, thereby reducing the footprint of the network traffic data, while preserving an ability to rely on the summarized network traffic data as useful forensic information. In addition, the apparatuses disclosed herein may summarize the network traffic data into condensed forms that maintain or closely approximate the statistical properties of the raw network traffic data using a small fraction of the original volume occupied by the network traffic data.

Through implementation of the apparatuses and methods disclosed herein, a large network traffic data set may be condensed without significantly sacrificing the information value of the network traffic data set. In addition, the apparatuses and methods disclosed herein may effectively reduce the size of the network traffic data, thereby reducing the amount of memory needed to store and use the data. Therefore, the data may be stored more efficiently and may be more usable by a wider range of data processing and analytics systems.

In examples, the apparatuses and methods disclosed herein may produce a summary structure, which may be generated in a form of a synopsis, a sample, a sketch, a wavelet, a histogram, a bit vector, combinations thereof, or the like. The summary structures may dynamically be adjusted when new network traffic data is collected and the existing data becomes outdated. In example summarization processes, the apparatuses and methods disclosed herein may partition the network traffic data set into windows based on associated features, such as time stamps, record counts, byte counts, etc., and data flows between pairs of communicating nodes may be aggregated. In addition, for every communicating node within a window (or equivalently, feature window), summarized data may be generated and kept using heterogeneous summary structures with different overheads and accuracies. A data distribution may be computed for the aggregated data flow of the pairs of nodes based on data attributes. According to examples of the present disclosure, the summary structures may be automatically selected based on the distribution, data query classification, and/or available memory, which is also referenced herein as a memory budget. In addition, the summary structure may be selected from a summary structure library.

FIG. 1 shows a block diagram of an example apparatus 100 that may summarize network traffic data. It should be understood that the apparatus 100 may include additional components and that some of the components described herein may be removed and/or modified without departing from a scope of the apparatus 100 disclosed herein.

The apparatus 100 may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the apparatus 100 may include multiple processors, multiple cores, or the like, without departing from a scope of the apparatus 100.

The apparatus 100 may also include a non-transitory computer readable medium 110 that may have stored thereon machine-readable instructions that the processor 104 may execute. Examples of the machine-readable instructions are shown as 112-124 and are further discussed below. Examples of the non-transitory computer readable medium 110 may include an electronic, magnetic, optical, or other physical storage device that contains or stores executable instructions. For example, the non-transitory computer readable medium 110 may be a Random Access memory (RAM), an Electrically Erasable Programmable Read-Only Memory (EEPROM), a hard disk, an optical disc, or other type of storage device.

The processor 104 may fetch, decode, and execute the machine-readable instructions 112-124. For example, the processor 104 may execute the machine-readable instructions 112 to assess network traffic data 102 collected at a data broker, which may collect realtime data feeds. The network traffic data 102 may pertain to data flows among nodes in a network. In addition, the processor 104 may execute the machine-readable instructions 114 to partition the network traffic data 102 into a plurality of time windows. The time windows may identify the time periods during which the network traffic data 102 may be collected.

The processor 104 may execute the machine-readable instructions 116 to aggregate data flows between pairs of nodes for each of the plurality of windows. The windows may be time-based (e.g., every certain number of time units) or count-based (e.g., every certain number of records). Thus, the network traffic data flow between pairs of communicating nodes may be accumulated over a time period defined by the window or by a records count within the window. The processor 104 may execute the machine-readable instructions 118 to compute a data distribution of each of the aggregated data flows. The processor 104 may compute the data distribution based on a data attribute or a set of data attributes. The data attributes may reflect parameters of network entities such as, for example, source and destination ports. The attributes may include flags, type of service (ToS) attributes, or the like. For example, the processor 104 may compute the data distribution based on data reflecting activity at a source port or at a destination port. In addition or in other examples, the processor 104 may also compute the data distribution based on the detected activity of a certain ToS.

The processor 104 may execute the machine-readable instructions 120 to select a summary structure for each of the aggregated data flows based on the computed data distributions of the aggregated data flows. The processor 104 may generate the summary structure in a form of a synopsis, a sample, a sketch, a wavelet, a histogram, a bit vector, or the like. In addition, the processor 104 may select the summary structure from a library. The processor 104 may further execute the machine-readable instructions 122 to generate a summary for each of the aggregated data flows using the selected summary structures for the aggregated data flows. Thus, the processor 104 may implement the selected summary structures for the data flows between each pair of connected nodes to summarize the data flows for the entire network traffic data collected within a particular time window.

The processor 104 may execute the machine-readable instructions 124 to store the generated summaries. The processor 104 may also condense the summaries based on a memory budget as discussed in more detail below. The processor 104 may further condense the summaries when the summaries become outdated, e.g., the processor 104 may remove the outdated summaries.

Figure 2:
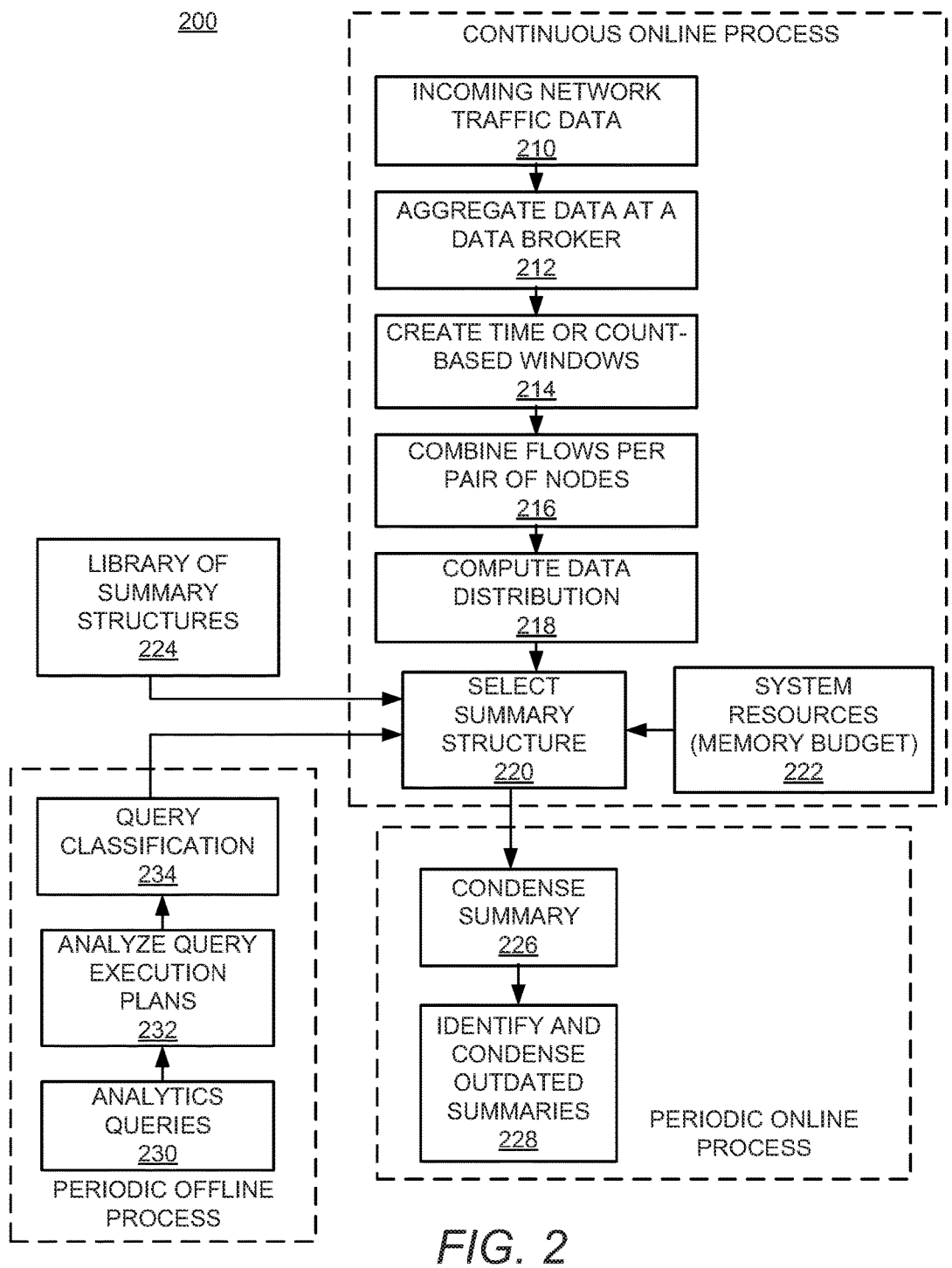
FIG. 2 shows a block diagram of an example architecture and workflow of the apparatus depicted in FIG. 1.

With reference now to FIG. 2, there is shown a block diagram 200 of an example architecture and workflow of the apparatus 100 depicted in FIG. 1. According to examples, the processor 104 may use the following inputs: a) a set (library) of summary structures; b) system resources (referred to as a memory budget); c) a collection of application specific, analytics queries; and d) a network traffic data set. Data sources contributing to the network traffic data set may include user computers, networks, endpoints, clouds, applications, servers (e.g., Proxy and Domain Name System servers), and the like. The data summarization process shown in FIG. 2 may include an offline process and an online process. Both of these processes are described in detail below.

The offline process may involve an analysis of input analytics queries 230, which may be performed as follows. A collection of analytics queries 230 may be analyzed in terms of their execution plans at block 232. In one example, a query execution engine may be a database engine that may offer tools for reporting the query execution plans that their query optimizer produces. For example, in database engines like PostgreSQL and Vertica™, this may be accomplished through execution of an explain command. The analysis of the query execution plans may identify heavy operations (group data, sort data) and the analytics queries 230 may use predicates (methods that may be requested, hosts, sources, destinations, protocols, etc.). In addition, at block 234, the queries may be categorized into classes based on their operators and predicates. Information pertaining to the analytics queries 230 obtained from the offline analysis may be used during the online process to determine how the incoming network data 210 is to be summarized. For example, when the processor 104 detects that a certain attribute of the network data set is not frequently queried, the processor 104 may allocate less memory budget to this attribute, and may maintain a more succinct or compacted representation of this attribute. Similarly, when the processor 104 determines that a certain statistic is requested for a set of attributes, the processor 104 may maintain enough aggregates to support that statistic. The processor 104 may return to the offline phase periodically to update the query classification 234. The updated query classification 234 may be used to adjust the resolution and the types of summaries to be maintained.

The online process may be implemented in two parts: the first part may run continuously and the second part may run periodically. The first part may start with incoming raw network traffic data 210. The processor 104 may aggregate the network traffic data 210 at a data broker 212. The data broker 212 may run on a separate system from the processor 104. In addition, the data broker 212 may handle some of the online operations, while the processor 104 may perform other operations. The processor 104 may also create windows 214 over the network traffic data 210. The windows 214 may be temporal (or time) windows or count-based windows. In each window, the processor 104 may combine flows per pair of nodes 216 and may compute the distribution of data per data attribute or a combination of data attributes 218. Based on the computed distribution, the query classes, and the available system resources 222, which may be referred to as memory budget, the processor 104 may identify and automatically select an appropriate summary structure 220 to summarize the values of individual data attributes or of the combination of the data attributes.

The processor 104 may select the summary structure from a library of summary structures 224. According to examples, once the data flows per pair of nodes are identified and the data distribution is computed, the processor 104 may implement an online set of diagnostics to identify potential network anomalies. The diagnostics may identify evidence for security incidents or even threats early on. An example diagnosis may include the identification of a scanning activity.

In examples, the processor 104 may take into account space limitations and summarization quotas to identify potential network anomalies. The processor 104 may address these in a second part of the online process. The processor 104 may perform this process periodically and may identify whether further condensing of the summaries computed using the selected summary structures block 220 is to be performed. The processor 104 may also implement the second part of the online process to determine whether some of the aging summaries have expired. The processor 104 may condense the summaries 226 based on the memory budget and may further condense the summaries 228, once the new network traffic data is assessed and the summaries have become outdated.

The windows may be static or dynamic. Static windows may be windows that may be either time-based, which define pre-determined number of time units, or count-based, which define pre-set count numbers of network traffic data records. In other words, time-based windows may determine a time period for network traffic data to be collected and the count-based windows may determine a number of flows and/or a volume of the data to be collected using a record count. For example, once 1 million records are collected based on the window record count, the data may be aggregated at the data broker 212 and may undergo the summarization process described above. In dynamic windows, the windows may be defined in various ways based on the information value of the incoming network traffic data. In an example, online aggregates per window may be maintained. Then, the incoming records having variance or skew that is within a certain distance (θ%) of the window median may be considered for accumulation and subsequent summarization.

According to examples, the processor 104 may keep aggregated network traffic data per window for each of the communicating pairs of nodes. This may significantly reduce the overall size of the network traffic data 102, while preserving various information (e.g., temporal information) as well as identities of different pairs of communicating nodes. The size reduction of the network traffic data 102 may be demonstrated by the following example, in which:

W—a total number of windows;
F—a total number of flows;
$f_{wi}$—a number of flows in window i;
$C_{wi}$—a number of communicating links in window i;
A—a total number of data attributes;
α—a number of attributes in a condensed data set;
$6_i$—a size of attribute and
$Y_j$—information kept per attribute i.

In this example, $C_{wi}$ may be a number of communicating node pairs in a window $W_i$. If the total number of attributes, on which the summary is maintained is a, and these summaries are of the size $Y_j$, then the total size of the condensed data with W windows is:

$$C_w = \Sigma_{i=0}^{W-1} C_{wi} \cdot \Sigma_{j=0}^{a-1} Y_j \quad \text{Equation (1):}$$

In addition, $f_{wi}$ may be the number of communicating node pairs in a window $W_i$. If the total number of attributes in the data set is A, and each is of size $6_i$, then the total size of the data is:

$$D_r = \Sigma_{i=0}^{W-1} f_{wi} \cdot \Sigma_{j=0}^{A-1} 6_j \quad \text{Equation (2):}$$

From equations (1) and (2), the overall reduction in size that is obtained by the example method may be calculated as follows:

$$\frac{D_r}{C_w} = \sum_{i=0}^{W-1} \frac{f_{wi}}{C_{wi}} \cdot \frac{\sum_{j=0}^{A-1} 6j}{\sum_{j=0}^{a-1} Y_j}. \quad \text{Equation (3)}$$

The achieved degree of reduction may depend on three factors:
(i) the ratio of number of flows to pairs of communicating nodes;
(ii) the number of attributes for which summaries are kept; and
(iii) the ratio of attribute size to the size of the summary kept for this attribute.

The first factor (i) may be a property of the data set and the factors (ii) and (iii) may be configurable parameters. The first factor (i) may be obtained by analyzing existing traces of the network traffic data.

As discussed above, the example summarization method uses communication pairs of nodes. For example, if a user downloads a page from a web server, then the user's computer may have one data flow with the DNS (Domain Name System) server and one data flow with the web server. This scenario accounts for two pairs of nodes and two data flows. However, if the same user continues his network activity and visits other pages on that server, the number of node pairs stays the same, but the number of flows may increase. Therefore, with a normal network activity over a time period, the number of communicating nodes may remain much smaller than the number of the associated data flows. Accordingly, aggregation of data flow per pairs of communicating nodes as disclosed herein may significantly decrease the size of network traffic data.

According to examples, the processor 104 may maintain data summaries for each of the pairs of communicating nodes in the data set. The processor 104 may summarize each of the data attributes separately using a synopsis such as:

aggregates—sum, sum of squares, counts that may be combined to get statistics of interest such as mean values, variance, and correlations;

bit vectors that discretize the domain of an attribute into bins. A corresponding bit may be set for every bin if at least one data flow exists between the pair of communicating nodes;

count histograms that are similar to bit vectors, but instead of maintaining just an existence bit, the count histogram may maintain the count of flows that fall within a specific bin;

wavelets that may decompose the data hierarchically into a coarse overall approximation of the data set together with detail coefficients. The number of detailed coefficients maintained may correspond to the accuracy of the results; or linear sketches that are linear transforms of the data. A linear sketch may be constructed to provide near-accurate answers to certain queries on the sketched data. For example, the count sketch may provide near approximate answers to the occurrence frequency of an individual element in the sketched data.

In examples, the summaries may be generated and maintained based on individual data attributes as well as based on a set of data attributes. Each of the summary structures discussed above may have a different storage overhead, utility, accuracy, or the like. Thus, for a given pair of nodes in a window, the processor 104 may decide between the different summary structures based on any of:

(i) the amount of memory assigned to a particular pair of communicating nodes;

(ii) the class of queries the summary has to answer; or (iii) the data distribution per an attribute.

The amount of memory that may be assigned to a pair of communicating nodes within a window may be proportional to the number of data flows. For instance, if $m_{wi}$ is the total memory assigned to a window $w_i$ and $f_{wi}^{jk}$ is the number of flows between a pair of nodes j and k in that window, then the memory assigned to the nodes j and k may be calculated as:

$$m_{wi}^{jk} = \frac{f_{wi}^{jk}}{f_{wi}} \cdot m_{wi}. \qquad \text{Equation (4)}$$

In addition to the memory, the class of queries that the summarized data may be expected to answer to may be used for selection of the summary structure. Furthermore, different properties of the data to be summarized, such as the standard deviation and the entropy to quantify the data distribution per a data attribute use frequency or a set of the attributes use frequency, may be used for selection of the summary structure as well. Attributes in this network traffic data set may exhibit a wide range of entropy. The attributes with large domain sizes, such as the source and destination ports may have a higher entropy than attributes with a more restricted domain such as flags or type of service (ToS) attributes. Thus, the processor 104, when summarizing different attributes in the data set, may assign different memory budgets and may apply summarization procedures to different attributes based on their entropies.

In examples, the processor 104 may calculate the accuracy for each of the available summary structures based on multiple factors, e.g., memory, class of queries, the data distribution, and/or the like. The processor 104 may select the summary structure with a maximum accuracy. For example, the size of a histogram depends on the size of the domain of an attribute, whereas the size of the sketch depends on the required accuracy. The processor 104 may make the choice to use a histogram or a sketch based on the domain size of a given attribute and a desired accuracy. The processor 104 may select a summary structure that minimizes the overall size. For example, for a filtered attribute with a small domain size such as protocol, the processor 104 may maintain histograms, whereas for the attributes with larger domain sizes such as source and destination ports, the processor 104 may maintain sketches.

In examples, the sketch accuracy may be determined as follows. For a given sketch with accuracy parameters ∈ and δ, counters w×d may be maintained, where w=2/∈ and d=log 1/δ. An example sketch may contain an array of positive numbers X. Thus, the sketch provides guarantees for estimates $x_i^e$ of $x_i$:

$$P(|x_i^e - x_i| \geq \in \Sigma_{i=0}^{N-1} x_i) \leq \delta \qquad \text{Equation (5):}$$

The additive error associated with each estimate $x_i^e$ is proportional to the total sum of elements stored within the sketch. If the values within the array x follow a heavy-tailed distribution, the magnitude of small and large values may be perturbed equally. However, relative to the original values, this error may have a higher fractional impact on the lower values than on the higher values. This property of the sketches may result in higher fractional errors for lower values in the summarization scheme. In an example, different parts of the domain may be summarized differently based on the sum that corresponds to them.

As the amount of data aggregated at the data broker 212 increases, the existing summaries may be condensed 226 to maintain more accurate summaries on the recent data and to comply with the memory budget. Overall, the memory budget assigned to any window may decay over time. Periodically, the processor 104 may trigger a condensing phase, during which the summaries maintained by individual windows may be further condensed to equalize their memory utilization with their current memory budget. In an example, during the condensing phase, the processor 104 may calculate the amount, by which, the overall memory utilization of a given window is to be reduced. The processor 104 may proportionally condense each of the summary structures maintained for each pair of communicating nodes in the time window. The processor 104 may condense the summary structures through any combination of the following operations:

(i) adjusting parameters of the summary structure, for example, decreasing the number of coefficients for a wavelet;

(ii) converting one summary structure into another, for example, converting a count histogram to a bit vector; or (iii) merging windows if needed.

Figure 3:
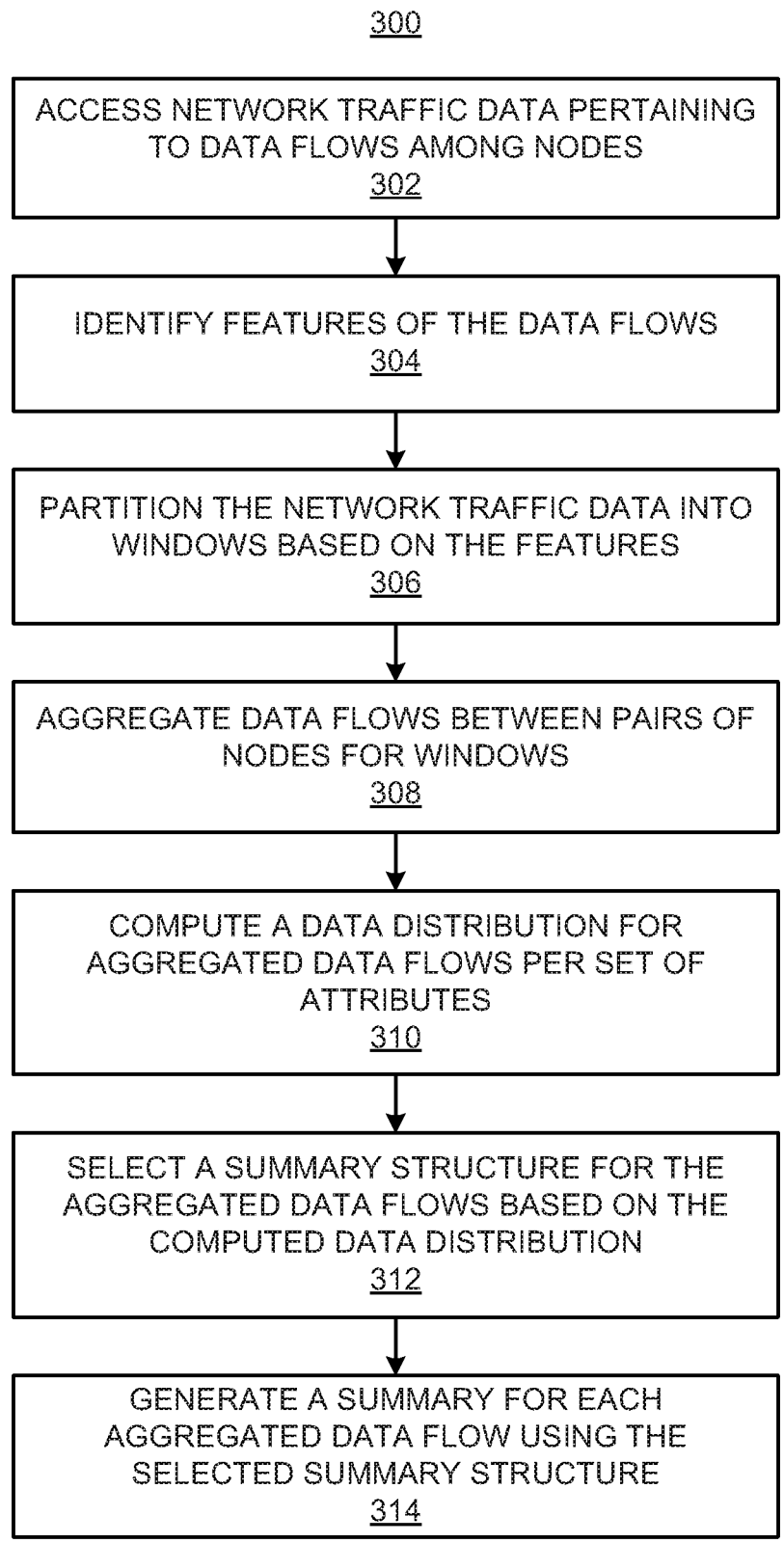
FIGS. 3 and 4, respectively, depict flow diagrams of example methods for network traffic data summarization.
Figure 4:
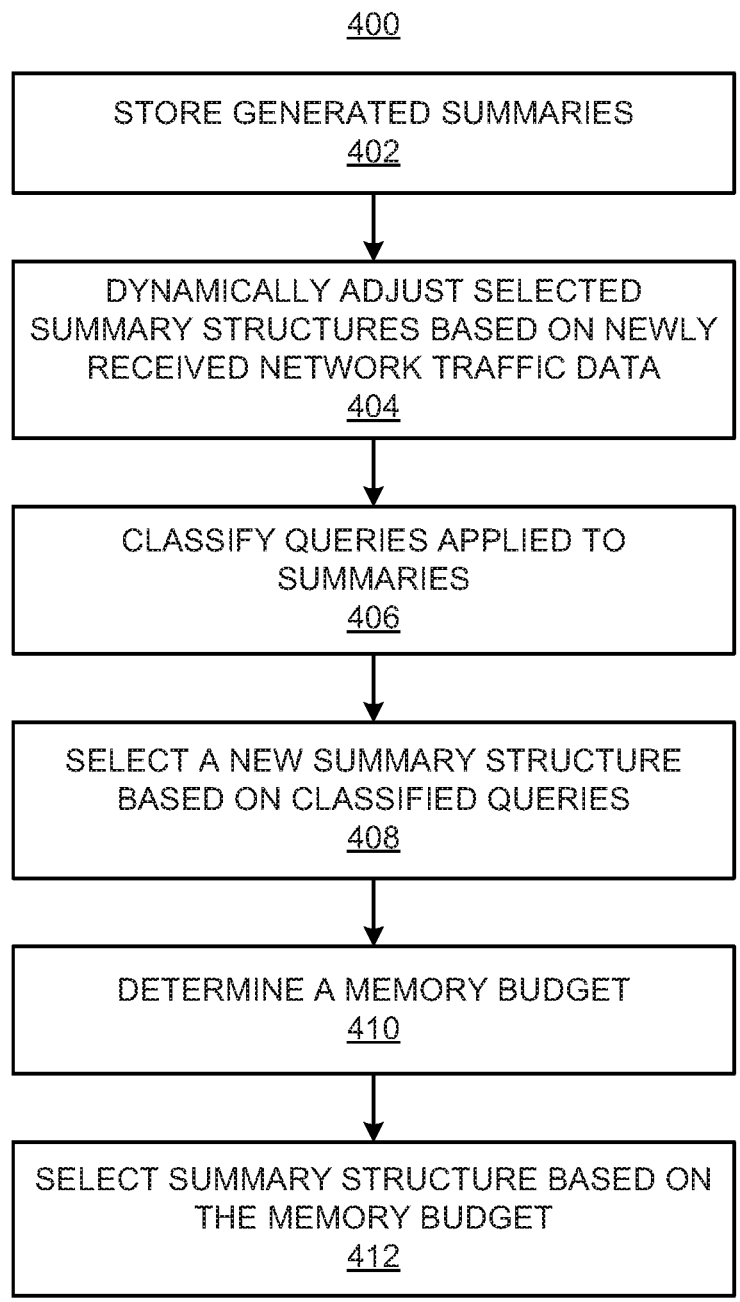

Turning now to FIGS. 3 and 4, there are respectively shown flow diagrams of example methods 300 and 400 for network traffic data summarization. It should be understood that the methods 300 and 400 depicted in FIGS. 3 and 4 may include additional operations and that some of the operations described therein may be removed and/or modified without departing from scopes of the methods 300 and 400. The descriptions of the methods 300 and 400 are also made with reference to the features depicted in FIGS. 1 and 2 for purposes of illustration. Particularly, the processor 104 may execute some or all of the operations included in the methods 300 and 400.

With reference first to FIG. 3, at block 302, the processor 104 may access network traffic data pertaining to data flows among nodes in a network. As discussed above, the incoming network traffic data may be aggregated at the data broker 212. At block 304, the processor 104 may identify features, such as time stamps, record counts, byte counts, etc., of the data flows and may partition the network traffic data into a plurality of windows based on the identified features of the data flows at block 306. As discussed above, the windows may be time-based (e.g., every pre-determined number of time units) or count-based (e.g., every pre-set count number of records). In other words, time-based windows may identify a time period for network traffic data to be collected and count-based windows may identify a number of flows and/or a volume of the data to be collected using a record count and/or a byte count.

At block 308, the processor 104 may aggregate data flows between pairs of nodes for each of the windows. The processor 104 may also compute a data distribution for each of the aggregated data flows per a set of data attributes at block 310. As discussed above, the processor 104 may compute the data distribution for a single data attribute as well. At block 312, the processor 104 may select a summary structure for each of the aggregated data flows based on the computed data distributions of the aggregated data flows. The summary structure may be selected from the library 224 (FIG. 2). At block 314, the processor 104 may generate a summary of each of the aggregated data flows using the selected summary structures for the aggregated data flows. As discussed above, the summaries may further be condensed to accommodate the memory budget.

Turning now to FIG. 4, at block 402, the processor 104 may store the generated summaries. As new network traffic data is aggregated at the data broker 212, at block 404, the processor 104 may dynamically adjust the selected summary structures based on the newly received network traffic data. As discussed above with reference to FIG. 2, a collection of analytics queries 230 may be analyzed in terms of their execution plans. The analysis of the query execution plans may identify heavy operations (group data, sort data) and predicates (methods that may be requested, hosts, sources, destinations, protocols, etc.) used by the analytics queries 230. The queries may be categorized into classes based on their operands and predicates. Information pertaining to the analytics queries 230 obtained during offline analysis may be used during the online phase to determine how the incoming network data 210 is summarized. At block 406, the processor 104 may classify the queries 230 and may select a new summary structure based on the classified queries at block 408. At block 410, the processor 104 may determine a memory budget and may select the summary structure based on the memory budget at block 412. Any subsequent network traffic data condensation may be dictated by the memory budget as well.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms. For example, the methods 300 and 400 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a processor;
a memory on which is stored machine readable instructions executable by the processor to:
access network traffic data pertaining to data flows among nodes in a network;
partition the network traffic data into a plurality of windows;
for each of the plurality of windows, aggregate data flows between pairs of nodes;
compute a data distribution of each of the aggregated data flows;
select a summary structure for each of the aggregated data flows based on the computed data distributions of the aggregated data flows;
generate a summary of each of the aggregated data flows using the selected summary structures for the aggregated data flows;
store the generated summaries;
classify queries applied to a summary of an aggregated data flow; and
select a new summary structure for the aggregated data flow based on the classified queries.

2. The apparatus according to claim 1, wherein the instructions are further executable by the processor to partition the network traffic data into windows based on associated time stamps, on record counts, or on byte counts.

3. The apparatus of claim 1, wherein the summary structure is at least one of:
a synopsis;
a data sample;
a histogram;
a wavelet;
a count;
a bit vector; or
a sketch.

4. The apparatus according to claim 1, wherein the instructions are further executable by the processor to aggregate the network traffic data at a broker prior to the partitioning of the network traffic data.

5. The apparatus according to claim 1, wherein the instructions are further executable by the processor to maintain the selected summary structure for each of the aggregated data flows until new network traffic data is received.

6. The apparatus according to claim 1, wherein the instructions are further executable by the processor to select the summary structure based on at least one of:
a data entropy;
a skew;
a memory budget; or
a data attribute use frequency.

7. The apparatus according to claim 1, wherein the instructions are further executable by the processor to dynamically adjust the selected summary structures for the aggregated data flows based on newly received network traffic data.

8. The apparatus according to claim 1, wherein the instructions are further executable by the processor to condense the summary based on a memory budget.

9. The apparatus according to claim 1, wherein the instructions are further executable by the processor to compute the data distribution per a set of data attributes.

10. The apparatus according to claim 1, wherein the instructions are further executable by the processor to identify and condense outdated summaries.

11. A computer-implemented method comprising:
accessing, by a processor, network traffic data pertaining to data flows among nodes in a network;
identifying, by the processor, features of the data flows;
partitioning, by the processor, the network traffic data into a plurality of feature windows based on the identified features of the data flow;
for each of the plurality of windows, aggregating, by the processor, data flows between pairs of nodes;
computing, by the processor, a data distribution of each of the aggregated data flows per a set of data attributes;
selecting, by the processor, a summary structure for each of the aggregated data flows based on the computed data distributions of the aggregated data flows;
generating, by the processor, a summary of each of the aggregated data flows using the selected summary structures for the aggregated data flows
classifying, by the processor, queries applied to a summary of an aggregated data flow; and
selecting, by the processor, a new summary structure for the aggregated data flow based on the classified queries.

12. The method according to claim 11, further comprising selecting the summary structure from a library of summary structures.

13. The method according to claim 11, further comprising:
maintaining the selected summary structure for each of the aggregated data flows until new network traffic data is accessed.

14. The method according to claim 11, further comprising:
selecting the summary structures for the aggregated data flows based on at least one of:
a data entropy;
a skew;
a memory budget; or
a data attribute use frequency.

15. The method according to claim 11, further comprising:
dynamically adjusting the selected summary structures for the aggregated data flows based on newly received network traffic data.

16. A non-transitory computer readable medium on which is stored machine readable instructions that when executed by a processor, cause the processor to:
access network traffic data pertaining to data flows among nodes in a network;
partition the network traffic data into a plurality of windows;
for each of the plurality of windows, aggregate data flows between pairs of nodes;
compute a data distribution of each of the aggregated data flows;
determine a memory budget;
select a summary structure for each of the aggregated data flows based on the computed data distributions of the aggregated data flows and the determined memory budget;
generate a summary of each of the aggregated data flows using the selected summary structures for the aggregated data flows;
store the generated summaries;
classify queries applied to a summary of an aggregated data flow; and
select a new summary structure for the aggregated data flow based on the classified queries.

17. The non-transitory computer readable medium according to claim 16, wherein the instructions are further to cause the processor to:
maintain the selected summary structure for each of the aggregated data flows until new network traffic data is accessed.

18. The non-transitory computer readable medium according to claim 16, wherein the instructions are further to cause the processor to:
select the summary structures for the aggregated data flows based on at least one of:
a data entropy;
a skew;
the memory budget; or
a data attribute use frequency.

* * * * *